(12) United States Patent
Chen

(10) Patent No.: US 10,750,236 B2
(45) Date of Patent: Aug. 18, 2020

(54) AUTOMATIC CONTENT RECOGNITION WITH LOCAL MATCHING

(71) Applicant: The Nielsen Company (US), LLC, New York, NY (US)

(72) Inventor: Juikun Chen, West Jordan, UT (US)

(73) Assignee: The Nielsen Company (US), LLC, New York, NY (US)

( * ) Notice: Subject to any disclaimer, the term of this patent is extended or adjusted under 35 U.S.C. 154(b) by 282 days.

(21) Appl. No.: 14/813,416

(22) Filed: Jul. 30, 2015

(65) Prior Publication Data

US 2016/0316262 A1 Oct. 27, 2016

Related U.S. Application Data

(60) Provisional application No. 62/151,915, filed on Apr. 23, 2015.

(51) Int. Cl.
*H04H 60/32* (2008.01)
*H04H 60/33* (2008.01)
(Continued)

(52) U.S. Cl.
CPC ..... *H04N 21/44008* (2013.01); *G06F 16/435* (2019.01); *G06F 16/9535* (2019.01);
(Continued)

(58) Field of Classification Search
CPC .......... H04N 21/44008; H04N 21/435; H04N 21/4394; H04N 21/23418; H04N 21/84;
(Continued)

(56) References Cited

U.S. PATENT DOCUMENTS 6,593,976 B1 * 7/2003 Lord .................. H04N 5/44
348/553
6,909,837 B1 6/2005 Unger
(Continued)

OTHER PUBLICATIONS

International Search Report and Written Opinion dated Jul. 22, 2016, on application No. PCT/US16/28583.
(Continued)

*Primary Examiner* — Kyu Chae
(74) *Attorney, Agent, or Firm* — McDonnell Boehnen Hulbert & Berghoff LLP

(57) ABSTRACT

A media device and method execute computer instructions to: generate a first query fingerprint of media content; send the first query fingerprint to a server; and receive, from the server, an identification of a first channel being watched in response to the server finding a match to the first query fingerprint. The media device iteratively receives, from the server, a plurality of fingerprints generated from the media content in locations ahead of where the media content is being received; store the plurality of fingerprints in a local database of a computer-readable storage medium; and compare a second query fingerprint of the media content with the plurality of fingerprints to determine whether the media device remains set on the first channel, without continuously pinging the server. When the media device locally detects a non-match with the second query fingerprint, the process starts over with it finding a match at the server.

21 Claims, 6 Drawing Sheets

(51) Int. Cl.
    *H04N 21/44* (2011.01)
    *H04N 21/81* (2011.01)
    *H04N 21/234* (2011.01)
    *H04N 21/2668* (2011.01)
    *H04N 21/8352* (2011.01)
    *H04N 21/658* (2011.01)
    *G06F 16/435* (2019.01)
    *G06F 16/9535* (2019.01)

(52) U.S. Cl.
    CPC ... *H04N 21/23418* (2013.01); *H04N 21/2668* (2013.01); *H04N 21/44016* (2013.01); *H04N 21/6581* (2013.01); *H04N 21/812* (2013.01); *H04N 21/8352* (2013.01)

(58) Field of Classification Search
    CPC ......... H04N 21/8352; H04N 21/44222; H04N 21/4532
    See application file for complete search history.

(56) References Cited

U.S. PATENT DOCUMENTS

| | | |
|---|---|---|
| 7,444,659 B2 | 10/2008 | Lemmons |
| 7,546,619 B2 | 6/2009 | Anderson et al. |
| 8,918,804 B2 | 12/2014 | Sinha et al. |
| 8,997,133 B2 | 3/2015 | Sinha et al. |
| 9,003,440 B2 | 4/2015 | Sinha et al. |
| 2003/0159157 A1* | 8/2003 | Chan ............... H04H 60/33 725/151 |
| 2004/0218103 A1 | 11/2004 | Onomatsu |
| 2005/0138658 A1* | 6/2005 | Bryan ............... H04H 60/27 725/46 |
| 2006/0190654 A1 | 8/2006 | Joy et al. |
| 2008/0104636 A1* | 5/2008 | Tanaka ............... H04N 5/505 725/38 |
| 2009/0055870 A1* | 2/2009 | Horibe ............... H04N 5/4401 725/46 |
| 2010/0033574 A1 | 2/2010 | Ran et al. |
| 2010/0066759 A1 | 3/2010 | Zhang |
| 2011/0064385 A1 | 3/2011 | Gharaat et al. |
| 2012/0117584 A1* | 5/2012 | Gordon ............... H04N 21/254 725/19 |
| 2013/0024894 A1 | 1/2013 | Eyer |
| 2013/0031582 A1 | 1/2013 | Tinsman et al. |
| 2013/0160038 A1 | 6/2013 | Slaney et al. |
| 2013/0204889 A1 | 8/2013 | Sinha et al. |
| 2013/0205315 A1 | 8/2013 | Sinha et al. |
| 2013/0276010 A1 | 10/2013 | Drayson |
| 2013/0308818 A1* | 11/2013 | MacIntosh ............... G06T 1/0021 382/100 |
| 2013/0312018 A1 | 11/2013 | Elliott et al. |
| 2014/0007152 A1* | 1/2014 | Pora ............... H04N 21/254 725/18 |
| 2014/0007162 A1 | 1/2014 | Harrison |
| 2014/0074621 A1 | 3/2014 | Chai et al. |
| 2014/0196085 A1 | 7/2014 | Dunker et al. |
| 2014/0250450 A1 | 9/2014 | Yu et al. |
| 2014/0282657 A1 | 9/2014 | Sinha et al. |
| 2015/0067147 A1 | 3/2015 | Carmel et al. |
| 2018/0167676 A1* | 6/2018 | Oztaskent ............... G06F 16/433 |

OTHER PUBLICATIONS

López-Nores, Martín, et al., "MiSPOT: Dynamic Product Placement for Digital TV through MPEG-4 Processing and Semantic Reasoning," Knowledge and Information Systems at 22, No. 1, pp. 101-128 (2009).

Gracenote, "Gracenote Takes on Targeted Advertising," at http://www.gracenote.com/events/targeted_advertising/, accessed Nov. 6, 2014.

International Search Report and Written Opinion received for International Patent Application No. PCT/US16/53998, 13 pages, dated Dec. 28, 2016.

* cited by examiner

AUTOMATIC CONTENT RECOGNITION WITH LOCAL MATCHING

CROSS-REFERENCE TO RELATED APPLICATION

This application claims the benefit of U.S. Provisional Application No. 62/151,915, filed Apr. 23, 2015, the entire disclosure of which is incorporated herein by this reference.

BACKGROUND

Media consumption devices, such as smart televisions (TVs), may access broadcast digital content and receive data, such as streaming media, from data networks (such as the Internet). Streaming media refers to a service in which media content such as movies or news may be provided to an end user over a telephone line, cable, Internet, and so forth upon request. For example, a user may view a movie without having to leave their residence. Also, users may access various types of educational content, such as video lectures, without having to physically attend at a school or educational institution.

As the number of media consumption devices continues to increase, video content generation and delivery may similarly increase. With an increase in use of media consuming devices (such as smartphones, tablets, and smart televisions) to access streaming media, content or network providers (such as local broadcasters, multi-channel networks, and other content owners/distributors) may distribute contextually-relevant material to viewers that are consuming streaming media (e.g., media programs). For example, local broadcasters may include contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
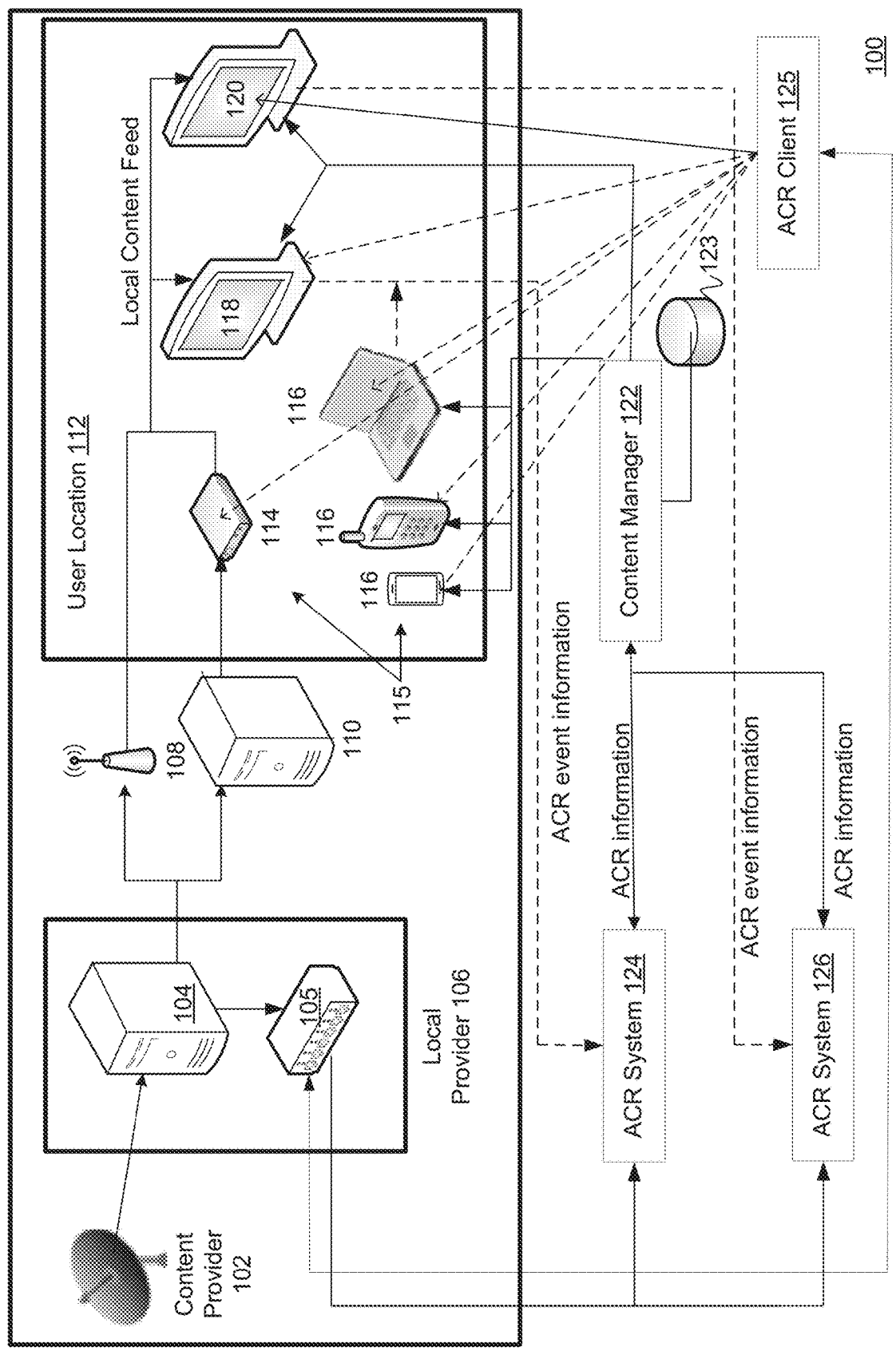
FIG. 1 illustrates a system diagram of a content distribution network with client-side automatic content recognition (ACR) fingerprint local matching according to one embodiment.

Media content broadcasting or streaming, such as television (TV) or internet show broadcasting, may be an engaging venue to advertise products and services, provide information to viewers, or any combination thereof. Accordingly, broadcasters want to know what programs (or channels) individual viewers are watching, and when, so that subject matter (and timing of commercials) of those programs may be used to accurately target advertising and other useful, optionally non-commercial information to the viewers. Non-commercial may include, for example, news alerts, announcements or educational information. It would therefore be advantageous to determine a program a user is watching or is about to watch, and to send an identification of the program information to a media device of the user or to an advertising server for use in such targeting actions.

To make this determination, query fingerprints may be generated from media content (e.g., a television program or channel) a user is watching using automatic content recognition (ACR). These query fingerprints may be compared with stored fingerprints within a database for a match. This database has historically been stored at a server (e.g., an ACR server) to which the fingerprints are sent to find one or more matches, resulting in an identification of the channel from which the television program currently being stream (or soon to be streamed) may be determined. The server then sends an identification of the media content (e.g., the television program) to a requesting entity, such as a smart television or an advertising server that may use the information to target the user with advertising during a commercial break, or as an overlay of the media content (which may or may not occur during a commercial break).

Because knowledge of the channel is time sensitive as commercial time slots change with different channels, a media device such as a television or set-top box queries the server continuously, for example every second or every several seconds. As the number of media devices streaming the media content grows, there is an exponential growth in the number of times the server is pinged with queries asking to confirm which channel each user is watching. This has become a significant load on the server in terms of bandwidth and processing power. The present disclosure seeks to alleviate the need for this continued querying of the server.

For example, a media device and method may include computer-readable storage medium storing instructions and a processing device to execute the instructions to generate a first query fingerprint of media content being consumed by a user. The media device sends the first query fingerprint to a server, and receives, from the server, an identification of a first channel being watched by the user in response to the server finding a match to the first query fingerprint. The media device may continuously receive, from the server, a plurality of fingerprints generated from the media content in locations ahead of where the user is viewing the media content, and store the plurality of fingerprints in a local database of the computer-readable storage medium. The media device may then compare a second (and any subsequent) query fingerprint of the media content with the plurality of fingerprints to confirm the user has not changed to a second channel different than the first channel. No further query of the server is necessary so long as the local database continues to return a match to the same channel.

When, however, the local database returns an answer that any subsequent (or second) fingerprint does not match with the same channel, the media device may query the server again to determine the new channel to which the user has changed the media device. Once the new channel is known, the server may continue to send the fingerprints (again, generated ahead of the point at which the user is viewing) to the media device to be stored locally. The media device may then proceed to confirm that the user remains on that new channel by comparing subsequent fingerprints with the newly stored fingerprints in the local database.

Furthermore, the media device may continuously receive from the server, in addition to the plurality of fingerprints of the television program or channel, a plurality of fingerprints from media content of nearby channels (e.g., sequentially near to the channel the user is currently watching) and/or a plurality of fingerprints from channels the user frequently watches. When local matching occurs, the media device may still find a match locally (even after a user changes the channel) within the fingerprints of a nearby channel or one of the user's favorite channels, thereby obviating the need to again query the server. In this way, knowledge of the viewing behavior of the user may be combined with local matching to greatly reduce the bandwidth and processing loads on the server.

The media device (or server) may send an identification of the channel to a look-up server that determines the television program the user is watching. The look-up server may then inform an advertising server of that television program and receive, from the advertising server, an advertisement contextually-relevant to a subject matter of the media program. The look-up or ad server may then deliver the advertisement (or other content) to the media device for display as an overlay or replacement advertisement (which could also be an informational segment) during a commercial break in the media program. Alternatively, the overlay may be overlaid on top of a portion of the television program that may refer to the subject matter of the overlay advertisement.

To provide viewers with media content, an individual or an organization may decide to stream the media content to viewers, such as by delivering the media content over the Internet to the viewers. The media content used by the individual or the organization may be media content (such as video data) acquired from one or more live broadcast media feeds. For example, a media content provider may provide a user with a linear media channel (e.g., media provided from a live media feed source to a viewer) over the Internet.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

In one embodiment, a content overlay system or a content overlay device may enable combining media content with specific, timely, and targeted overlay content such as advertising. The content overlay system or content overlay device may enable overlay content providers to engage with viewers by inviting the viewers to respond to a call to action within the content overlays (e.g., an invitation to engage the content overlay). One advantage of inviting the viewers to a call to action may be to provide a return path or follow-up path for the viewers to request additional information, ask questions, provide input, contact a provider of a service or product advertised, and so forth. Another advantage of inviting the viewer to a call to action may be to provide a return path or follow up path for the advertisers to provide additional information, further engage the viewers, gather additional information about the viewers, answer viewer questions about the product or service advertised, and so forth. In another example, the content overlay system or the content overlay device may enable an advertiser to use cross platform retargeting campaigns once a viewer has viewed and/or interacted with an overlay content of a media program.

FIG. 1 illustrates a system diagram of a content distribution network 100 according to one example. In the content distribution network 100, a content provider 102 may broadcast a content feed to a local provider 106. The local provider 106 may include a headend 104 and an automatic content recognition (ACR) fingerprinter server 105. The content feed from the content provider 102 may be received at the headend 104 of the local provider 106. The headend 104 may generate a local content feed based on the received content feed. For example, the headend 104 may be a local affiliate broadcaster receiving a network channel with programming and advertisements from a national or global broadcaster.

The headend 104 may communicate the local content feed to the ACR fingerprinter server 105, an over-the-air (OTA) broadcaster 108, and/or a multichannel video programming distributor (MVPD) 110. The OTA broadcaster 108 and/or the MVPD 110 may communicate the local content feed to media device 115. Some examples of media devices include client devices 118 and 120, a set top box 114 that streams provider content to the client devices 118 and 120, as well as other devices 116 through which the user may stream the local content feed, e.g., wirelessly.

In one example, the OTA broadcaster 108 may broadcast the local content feed using traditional local television or radio channels. In this example, the client devices 118 and 120 may include antennas (such as TV or radio antennas) and receive the local content feed. In another example, the MVPD 110 (such as cable or satellite broadcaster) may communicate the local content feed to a set top box 114. In this example, the set top box 114 may format the content feed for the client devices 118 and 120 and may communicate the formatted content feed to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television may include the antennas, the set top box 114, and a display device in a single unit.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers.

In some embodiments, automatic content recognition may be performed in a distributed architecture as described herein. In these embodiments, an ACR client 125 (e.g., a local ACR system or a local ACR fingerprint matcher) may reside on any media device 115. The ACR client 125 may perform ACR fingerprint local matching as described herein. The interactions of the ACR client 125 with the ACR fingerprint server 105 (or other system of FIG. 1 or FIG. 2) are described in more detail below with respect to FIGS. 2 and 3.

The ACR fingerprint server 105 may analyze the local content feed and capture fingerprints, which may include an ordered sequence of frames from the local content feed. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126. The ACR systems 124 and 126 may establish communication connections with the different media devices 115. The media devices 115 may communicate fingerprint information to the ACR systems 124 and 126, respectively. When the ACR system 124 or 126 receives ACR fingerprint information from the media devices 115, the ACR system 124 or 126 may match the received fingerprints with those generated by the ACR fingerprint server 105. When a match occurs and the content has been identified, the ACR system 124 or 126 may communicate ACR events to a content manager 122.

In another example, the ACR system 124 or 126 may receive ACR fingerprint information from a media device 115 and may match the received fingerprints with those generated by the ACR fingerprint server 105. When a match occurs and the content has been identified, the ACR system 124 or 126 may notify the media device 115 of the ACR events and then the media device 115 may communicate those ACR events to the content manager 122. Alternatively, or additionally, the ACR system 124 or 126 may directly communicate the ACR events to the content manager 122. The ACR fingerprint information may include: a display of advertisements in the local content feed to a viewer, a display of selected or flagged content in the local content feed to a viewer, a change of content channel at the media device 115, and so forth.

The event information from the different ACR systems 124 and 126 may be in different formats and the content manager 122 may normalize the data into a common format before storing the data into a database 123. For example, the content manager 122 may receive disparate data sets from the ACR systems 124 and 126 that include similar but not identical data, such as data with the same content but formatted differently. The content manager 122 may process and reformat the disparate data sets to create a single data model or format (e.g., reformatted data sets) and the reformatted data sets may be populated into the database 123 in the content manager 122.

In one embodiment, to normalize disparate data sets from ACR systems 124 and 126, the content manager 122 may cleanse or filter data in the data sets. For example, some data sets may contain fields or data that may be irrelevant to the content manager 122. In this example, the content manager 122 may cleanse or filter the irrelevant data (e.g., the data may be removed or ignored). In another example, some data sets may include instances of incomplete or incorrect data or data sets and the content manager 122 may cleanse or filter the incomplete or incorrect data or data sets. In another embodiment, to normalize the disparate data sets from ACR systems 124 and 126, the content manager 122 may map fields of the data sets. For example, when the content manager 122 receives a first data set from the ACR system 124 and a second data set from the ACR system 126, at least some of the data fields of the first data set and the second data set may be common to both the first and second data set. However, the common data fields may be located at different places in the first and second data sets. In this example, the content manager 122 may map the different data fields of the first and second data sets to normalized fields and have the same data fields in the same data field locations in the database 123.

In another embodiment, to normalize disparate data sets from the ACR systems 124 and 126, the content manager 122 may derive data from the data sets. For example, data from the ACR systems 124 and 126 may not contain all of the fields that are needed to fill the data fields in the database. However, the content manager 122 may use other fields in the data sets from the ACR systems 124 and 126 to derive data for these data fields.

In one example, the database 123 may include data fields for such as a state in a country field, a designated market area (DMA), and a county and/or city field but the data sets from the ACR systems 124 and 126 may only include zone improvement plan (ZIP) codes. In this example, the content manager 122 may use the ZIP codes to derive data for the fields in the database. In another example, the data set may not contain any geographic location information, but may include an internet protocol (IP) address of the ACR systems 124 and 126. In this example, the content manager 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content manager 122 with the IP address of the media devices 115. The content manager 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In one embodiment, the content manager 122 may use the normalized data to generate reports or data (viewing data) about user viewing behavior across different ACR technology vendors and smart TV or other Internet-connected video devices. The content manager 122 and the media devices 115 may include communications interfaces to communicate information, such as overlay content, between the media devices 115 and the content manager 122. In one example, the communication interface may communicate the information using a cellular network and/or a wireless network. In one example, the communications network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communications network may be a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communications network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communications network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 may also instruct the media devices 115 to replace portions of the local content feed received from the OTA broadcaster 108 or the MVPD 110 with overlay content. In another example, the content manager 122 may instruct the media devices 115 to overlay or superimpose overlay content onto portions of the local content feed. The content manager 122 may aggregate ACR information across multiple ACR systems 124 and 126 and may communicate overlay content to different media devices 115 (such as client devices from different device manufacturers).

The content manager 122 may also establish communication connections with other devices 116. In one example, the other devices 116 may communicate with the client devices 118 and 120 and provide an additional screen (e.g., a second screen) to display overlay content. For example, the client devices 118 and 120 may receive the local content feed from the OTA broadcaster 108 or the MVPD 110 and display the local content feed to the user. The other devices 116 may also communicate ACR event information to the ACR systems 124 and 126 when an ACR event occurs, as discussed in the preceding paragraphs. When the content manager 122 receives the ACR event information, the content manager 122 may communicate overlay content to the other devices 116.

In one example, the client devices 118 and 120 may continue to display the local content feed while the other devices 116 display the overlay content. In another example, the client devices 118 and 120 and the other devices 116 may both display the overlay content. In another example, the client devices 118 and 120 and the other devices 116 may display a portion of the overlay content and a portion of the local content feed. In another example, the client devices 118 and 120 and the other devices 116 may display different local content feeds and different overlay content.

In one example, the client devices 118 and 120 and/or the other devices 116 may display the overlay content at the time the overlay content is received. In another example, the client devices 118 and 120 and/or the other devices 116 may delay displaying the overlay content for a threshold period of time. The threshold period of time may be a predefined period of time or the content manager 122 may select a period of time for the client devices 118 and 120 and the other devices 116 to delay displaying the overlay content.

Figure 2:
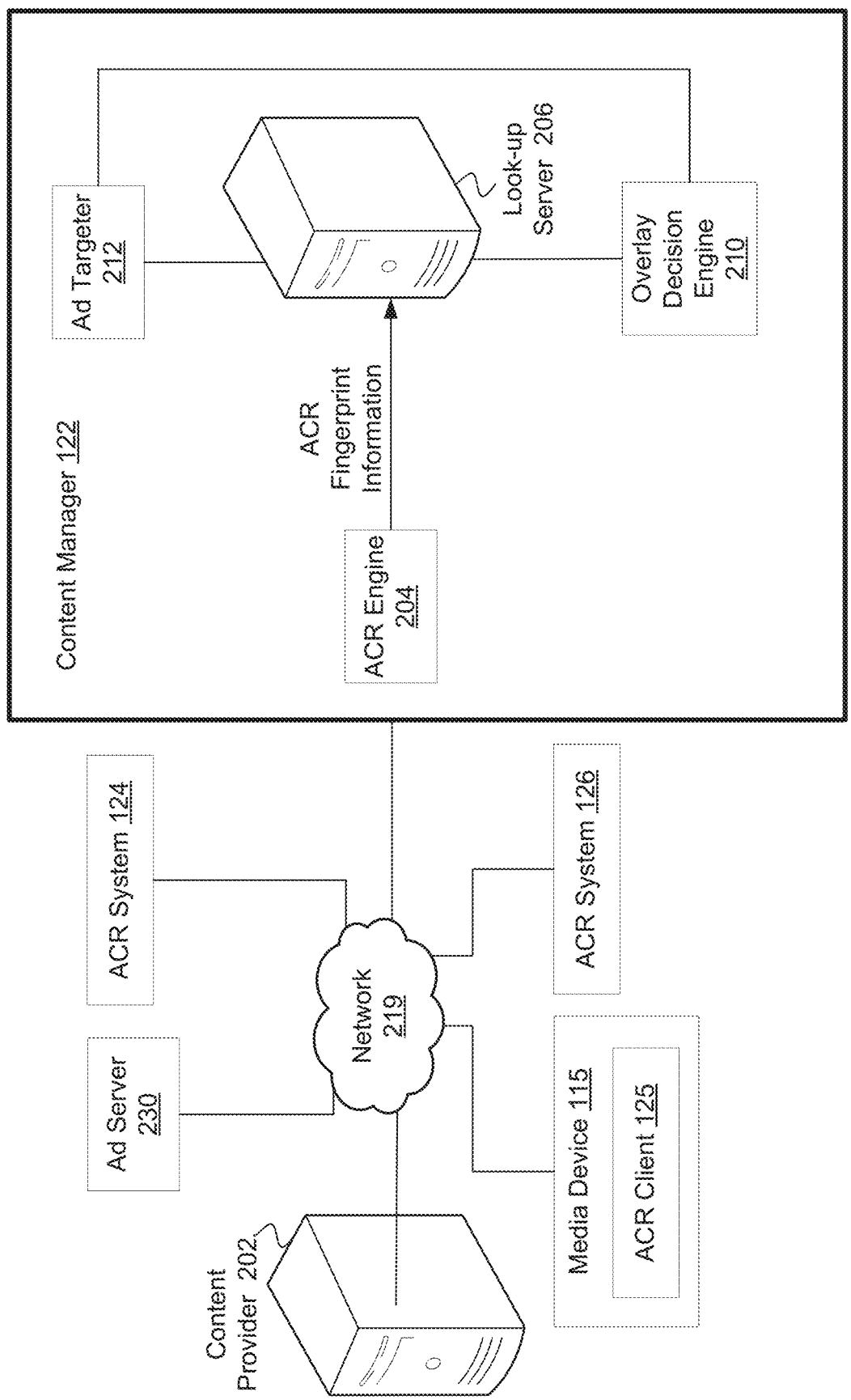
FIG. 2 illustrates a content manager in communication with an ACR client, which performs fingerprint matching on a client media device according to one embodiment.

FIG. 2 illustrates a content manager 122 in communication with the ACR client 125 of a media device 115 that performs fingerprint matching locally on the media device according to one embodiment. A content provider 202 may stream media content to the media device 115 over a network 219, which streaming may be intercepted by the ACR content manager 122 before, or simultaneously with the streaming of the media content to the media device 115. The content manager 122 may also communicate with an advertisement server (or "ad" server) 230 such as to send the ad server 230 an advertising call that requests an advertisement be served with (or as an overlay to) the media content to target the subject matter of the media content and/or interests of a user as will explained in more detail.

The content manager 122 may include an ACR engine 204, a look-up server 206, an overlay decision engine 210, and an ad targeter 212. The content provider 202 may upload media content to the ACR engine 204. The ACR engine 204 may fingerprint the media content. In one example, fingerprints may be generated by fingerprinting every frame of a feed, every other frame of the feed, a sequence of frames and so forth. For example, the ACR engine 204 may generate a fingerprint for a frame of the feed by performing a discrete cosine transform (DCT) of the frame and designating a subset of the resulting coefficients (e.g., the low-frequency coefficients) as the fingerprint.

With further reference to FIG. 2, the ACR engine 204 may communicate ACR fingerprints to the look-up server 206, which may look up and determine a television program (or the like) and location within the television program corresponding to an ACR event received from the ACR system 124 or 126. Each fingerprint of a segment of the feed may be associated with a time stamp. The time stamp may belong to individual frames of the segment of the feed when received by the ACR engine 204. The time stamp may be a frame number within the feed from an arbitrary starting point. The look-up server 206 may store the fingerprints in association with their respective time stamps, and aid the ad targeter 212 and the overlay decision engine 210 in timing and content targeting within the media content of the feed that the user is viewing.

In one embodiment, the ACR engine 204 interacts with the ACR client 125 at various media devices 115 (FIG. 1). The ACR client 125 may locally match fingerprints and confirm whether or not the user has changed a channel to watch a different television program. Details regarding the ACR client 125 are described below with respect to FIG. 3.

The media device 115 may include an ACR client (also referred to herein as the ACR client 125) that may periodically, continuously, or semi-continuously communicate user fingerprint information to the look-up server 206. The look-up server 206 may determine when there may be a match between the ACR fingerprint information (stored at the look-up server 206, for example) and the user fingerprint information. When there is a positive match, the look-up server 206 may communicate a positive match indicator to the ACR client 125. The ACR client 125 may send an overlay request to an overlay decision engine 210 requesting a media content overlay.

In one example, the overlay request may include a media content identifier (ID). In another example, the overlay request may include overlay information or overlay parameters (as discussed in the proceeding paragraphs). In one example, the overlay decision engine 210 may use the content ID, overlay information, and/or overlay parameters to identify targeted overlay content. In another example, the overlay decision engine 210 may use the content ID, overlay information, and/or overlay parameters to identify an overlay format. The overlay decision engine 210 may compare the content ID, overlay information, and/or overlay parameters with an overlay database to identify the targeted overlay content and/or the overlay format. The overlay database may be updated, by a content provider or an advertiser, with new overlay content and/or overlay formats on a periodic or continuous basis.

When the overlay decision engine 210 identifies the targeted overlay content, the overlay decision engine 210 may return targeted overlay content to the media device 115. In one example, the overlay decision engine 210 may communicate the targeted overlay content directly to the media device 115, such as via a wireless communications network. In another example, the overlay decision engine 210 may communicate the targeted overlay content to the media device 115 via a universal resource locator (URL). In one example, when multiple targeted overlay contents match the content ID, overlay information, and/or overlay parameters, the overlay decision engine 210 may select the targeted content overlay that meets a greatest number parameters and/or other information (e.g., greater than the other overlay content). In another example, when multiple targeted overlay contents match the content ID, overlay information, and/or overlay parameters, the overlay decision engine 210 may randomly select an overlay content that meets the parameters and other information. In another example, when multiple targeted overlay contents match the content ID, overlay information, and overlay parameters, the overlay decision engine 210 may select predetermined overlay content that matches the content ID, overlay information, and/or overlay parameters. The overlay content may be populated with dynamic content (e.g., content that may be updated or refreshed at periodic intervals). The dynamic content may be stored in a local database or an external system.

The ACR client 125 of the media device 115 may superimpose overlay content over the content feed when the ACR fingerprint information matches the user fingerprint information. In one example, the client device 208 may superimpose overlay content over the content feed in a hypertext markup language (HTML) browser. In another example, the client device 208 may superimpose overlay content over a content feed from an OTA broadcaster or a cable broadcaster. When the overlay content is placed over the content feed, the overlay content may be displayed to the user via a display of the media device 115. In one example, the overlay content may include one or more call to action options that may be displayed to a user. In this example, the user may interact with the overlay content using an input device (such as a TV remote, keyboard, a smartphone, or a tablet) to create feedback information. The ACR client 125 may communicate the feedback information to an ad targeter 212. Another individual, such as an advertiser, may access the feedback information and analyze the feedback information to determine desired information, such as user interest in the overlay content.

The ACR client 125 may monitor the content feed to determine when the overlay content and content feed match ceases and/or a threshold period of time expires. In one example, when the overlay content and content feed match ceases and/or a threshold period of time expires, the media device 115 may cease to superimpose the overlay content for display on the media device 115.

In other embodiments, the ACR client 125 may perform some of the fingerprint matching locally for some or all of the fingerprint matching. That is, the ACR client may perform these computations locally on the client device 208, instead of on the server (e.g., look-up server 206). It should be noted that the ACR operations described herein do not require to be used in the overlay system context. That is, the ACR fingerprint local matching by the ACR client 125 may be used in other systems with less or more than the other systems described in the context of overlays.

Figure 3:
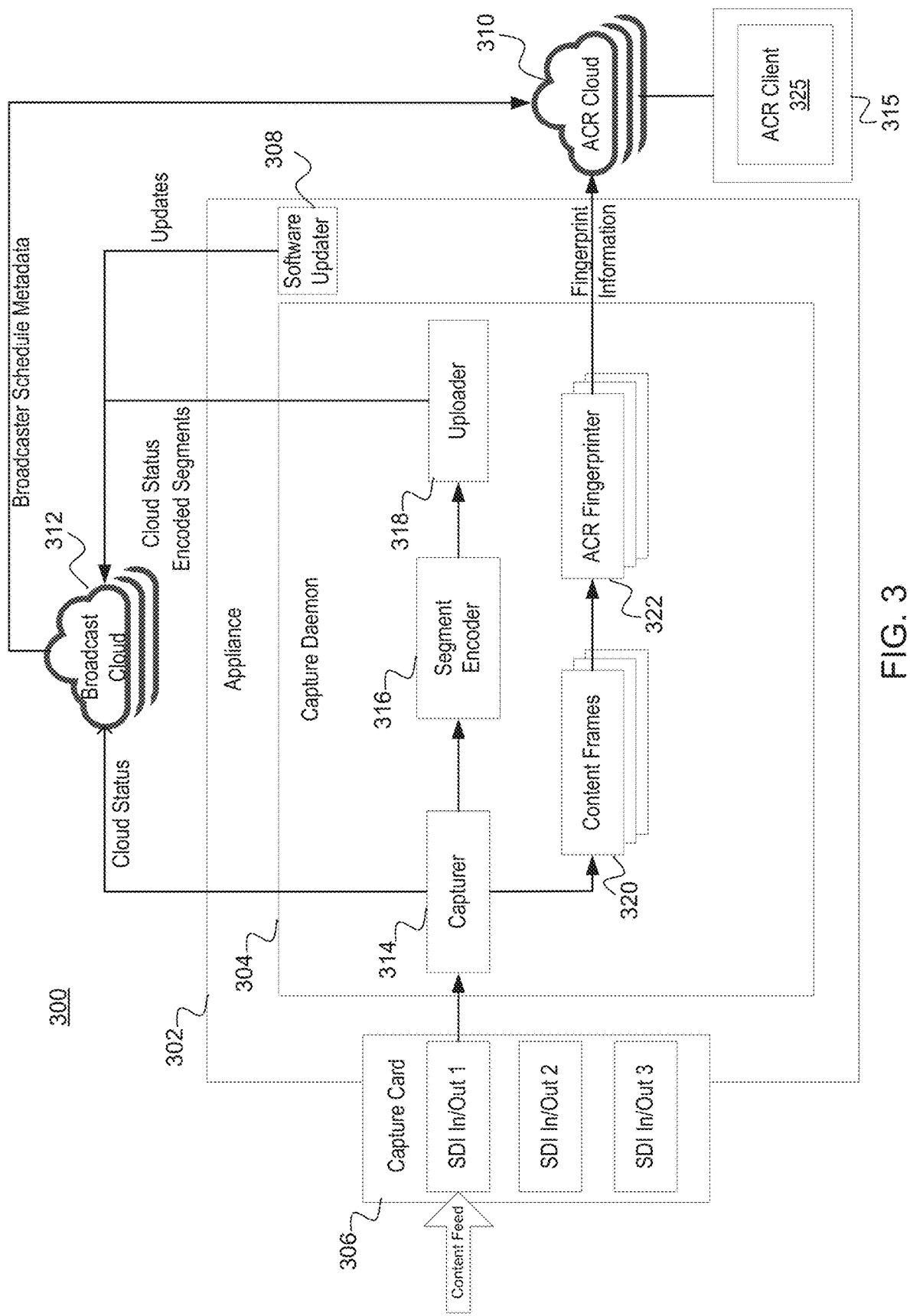
FIG. 3 illustrates a system diagram of a content distribution network with client-side ACR fingerprint local matching according to one embodiment.

FIG. 3 illustrates a content preparation system 300 with client-side ACR fingerprint local matching according to one embodiment. The content preparation system 300 may include a content device 302 such as an appliance or other device, an ACR cloud 310 (e.g., server-side ACR operations described above with respect to FIG. 1 and FIG. 2), and a broadcast cloud 312. The content device 302 may include a capture daemon 304, a capture card 306, and a software updater 308. The capture daemon 304 may further include a capturer 314, a segment encoder 316 and an uploader 318 within a chain of processing, and content frames 320 and an ACR fingerprinter 322 to fingerprint media content captured by the capturer 314. The content device 302 may receive media content (also referred to herein as just "content") from a content feed and prepare the content to include contextually-relevant material that may be delivered to a media device 315 that consumes the media content for viewing by a user. The media device 315 may include an ACR client 325 for performing ACR fingerprint local matching. The content feed may be received using the capture card 306.

The capture card 306 may be used to capture and convert media content (such as audio and/or video content) from a content feed, such as stream encoded using HD-SDI (high-definition serial digital interface) developed by The Society of Motion Picture and Television Engineers. In one example, the capture card 306 may receive a content feed using a coaxial cable port. In another example, the capture card 306 may receive a content feed using a high definition multimedia interface (HDMI) port. The capture card 306 may include serial digital interfaces (SDI) ports. The SDI ports may be configured to receive content (input ports) or send content (output ports). The capture card 306 may receive one or more content feeds using the SDI ports. When the capture card 306 receives multiple content streams, each content feed may be fingerprinted, encoded and uploaded, as discussed previously. For example, the capture card 306 may receive two content feeds using SDI IN 1 and SDI IN 2, respectively. In this example, the capture daemon 304 may process the content feeds in parallel.

When the capture card 306 receives content on a content feed, the capture box may send the content to a capturer 314. The capturer 314 may be software to control and interact with the capture card 306. The capturer 314 may instruct the capture card 306 to use an SDI port as an input and/or instruct the capture card 306 how to obtain incoming media content, such as audio/video ("A/V") data. The capturer 314 may use the capture card 306 to obtain advanced media content information and perform advanced functions, such as, for example: closed caption information; time codes delivered within the feed; and adjust media content data, such as color space conversion or scaling.

When the capturer 314 receives the content from the capture card 306, the capturer 314 may provide the content to both the ACR fingerprinter 322 and to the encoder 316. For example, the capturer 314 may provide A/V data to both the ACR fingerprinter 322 and the encoder 316, e.g., split the content for delivery to the ACR fingerprinter 322 and the encoder 316. In one example, the capturer 314 may communicate with the broadcast cloud 312 to indicate when media content is being received via the capture card 306 for uploading to the broadcast cloud 312, e.g., a streaming status.

In another example, the capturer 314 may receive a status message from the broadcast cloud 312 indicating a status of the broadcast cloud 312 to receive streaming content from the capture daemon 304, e.g., a receiving status. For example, the capture daemon 304 may communicate with the broadcast cloud 312 using a polling method. In this example, the capture daemon 304 may send a status message to notify the broadcast cloud 312 of a streaming status of the capture daemon 304 (such as content ready for streaming or no current content for streaming) and may additionally retrieve a receiving status from the broadcast cloud 312.

In yet another example, the capturer 314 may provide system metric information to the broadcast cloud, such as central processing unit (CPU) utilization, memory utilization, drive utilization, operating temperature, and so forth. In another example, the software updater 308 may be configured to update the content device 302. For example, the content device 302 may use a polling method to communicate with the broadcast cloud 312 to determine when an update has been scheduled.

A segment encoder 316 (hereinafter encoder 316) may receive content from the capturer 314 and encode the content to provide secure content for transferring of data between the broadcast cloud 312 and the media device 315, such as the client device 118 or 120. The encoder 316 may also encode or convert the data to adjust for varying display sizes, processing capabilities, network conditions, and/or battery capabilities of the media consumption device. The encoder 316 may write content segments to disk or memory of the encoder 316. When the content has been encoded, the encoder 316 may then communicate encoded content to the uploader 318. After the content is communicated to the uploader 318, the content segments may be deleted from the disk or memory of the encoder 316. When the uploader 318 receives the encoded content, the uploader 318 may upload the encoded content or segments of the encoded content to the broadcast cloud 312. When the uploader 318 has uploaded the encoded content, the uploader 318 may notify the broadcast cloud 312 that the encoded content has been encoded and provide content metadata, such as a time the content was captured by the capture card 306 and/or a duration of the media content.

The broadcast cloud 312 may process the uploaded encoded content or segments before delivering the content or segments for playback at the media device 315. This processing by the broadcast cloud may include transcoding the content or segment into multiple bit rates to support adaptive bit rate playback and uploading all resultant segments to a content delivery network (CDN).

In parallel with communicating the content to the encoder 316, the capturer 314 may communicate the content frames 320 to an ACR fingerprinter 322. In one example, the content frames 320 may be audio data. In another example, the content frames 320 may be video data. In this example, video content may be made up of raw video frames. When the ACR fingerprinter 322 receives the content frames 320, the ACR fingerprinter 322 may determine how to process the content frames 320, such as to process the raw video frames.

In one example, the video frames may be fingerprinted individually. In another example, the video frames may be fingerprinted in collections or sequences. The ACR fingerprinter 322 may determine when to fingerprint the video frames individually or sequentially based on an ACR algorithm used by the ACR fingerprinter 322. In another example, the ACR fingerprinter 322 may fingerprint the content frames 320 differently for different broadcasters or users. In this example, the ACR fingerprinter 322 may include different ACR fingerprinting algorithms for different ACR vendors. In one example, the different ACR fingerprinting algorithms may be predetermined and stored on a memory of the ACR fingerprinter 322. In another example, the different ACR fingerprinting algorithms may be provided by third party ACR vendors. When the different ACR fingerprinting algorithms are provided by the third party ACR vendors, the ACR fingerprinter 322 may aggregate the different ACR fingerprinting algorithms. In one example, ACR fingerprinting may use raw video with in the YUV 4:2:2 colorspace and at high resolutions. When video content is received at the capture card 306, the capturer 314 may convert the video content to YUV 4:2:0 colorspace and scale it down in resolution to a threshold resolution level for encoding by the encoder 316.

When the ACR fingerprinter 322 has fingerprinted the content frames 320 of the media content, the ACR fingerprinter may send fingerprints (including channel information, time codes, and fingerprint information) to the ACR cloud 310, which can be any local or remote server as discussed with reference to FIGS. 1 and 2. In one example, the different ACR fingerprinting algorithms may be used on the same media content to provide different fingerprint information to ACR clouds 310 of different ACR vendors. An advantage of fingerprinting the same content may be to provide contextually-relevant advertisements and interactive content to different viewers of media consumption devices such as the media device 315. In another example, the content frames 320 may include media content from different feeds. In this example, the different ACR fingerprinting algorithms may be used on the content of the different feeds to provide different fingerprinting information to ACR clouds 310 of different ACR vendors.

The different fingerprinting information may be uploaded to ACR clouds 310 of the different ACR vendors, respectively. Different ACR vendors may be integrated on viewing devices manufactured by different contract equipment manufacturers (CEMs). For example, televisions manufactured by Toshiba® may utilize Samba ACR fingerprinting and television manufactured by Samsung® may use fingerprinting using ACR technology by Enswer®. An advantage of the ACR fingerprinter 322 employing ACR fingerprinting algorithms for different ACR vendors may be to enable content to be fingerprinted and provided to viewers via different ACR vendors regardless of the manufacturer of the media consumption device.

In one example, the ACR clouds 310 may use the ACR fingerprinting information for digital advertisement replacement (DAR). In another example, the ACR fingerprinting information may be used for advertisement or content augmentation and data collection. Fingerprinting information may be sent to the ACR cloud 310, where the ACR cloud 310 may use the fingerprinting information to match the encoded content with contextually-relevant advertisements and interactive content. The matched encoded content, contextually-relevant advertisements and interactive content may then be provided to media devices 315 for display. In another example, information about the matching events may be communicated to the broadcast cloud 312 for analysis of content matching.

In one example, ACR fingerprinting information may be delivered to the ACR cloud 310 before encoded segments may be communicated to the ACR cloud 310 from the broadcast cloud 312. In another example, the encoded segments may be uploaded to the ACR cloud 310 when an entire segment has been encoded. In another example, content may be continuously fingerprinted and resultant fingerprinting information may be continuously communicated or communicated at select rates to the ACR vendor clouds. The selected rates may be based on the different ACR vendors. For example, one vendor may deliver ACR fingerprinting information several times per second, whereas another vendor may deliver this information once every 2-5 seconds.

In one example, the content device 302 may encode, encrypt, and upload the media content to the broadcast cloud 312. In another example, the content device 302 may receive broadcaster-specific schedule metadata from the broadcaster (data about what shows and ads are in the content feed received at the capture card 306). The content device 302 may communicate metadata to the broadcast cloud 312. In another example, the broadcast cloud 312 may communicate metadata (such as broadcaster-specific schedule metadata) to an ACR cloud 310 or a different ACR cloud 310 of a different vendor so that vendors may use the metadata to match up to the fingerprint information received from the ACR fingerprinter 322.

An advantage of the content preparation system 300 providing encoding, uploading and fingerprinting may be to provide fault tolerant content streaming with ACR fingerprinting. For example, when the ACR fingerprinter 322 fails, content streaming may continue without interruption and the ACR fingerprinting may be restarted. In one example, the content preparation system 300 may perform ACR fingerprinting as a separate process from content encoding and uploading to avoid faults in providing streaming content for viewing.

In one example, the ACR fingerprinter 322 may perform ACR fingerprinting upstream of broadcast distribution in the content preparation system 300. In another example, for the content preparation system 300, the ACR fingerprinting may occur in the broadcast chain where broadcast feeds may be delivered for encoding and uploading. An advantage of performing ACR fingerprinting occurring where the broadcast feeds may be delivered for encoding and uploading may be to enable the content preparation system 300 to combine the ACR fingerprinting and encoding and uploading into a single appliance. Another advantage of performing ACR fingerprinting occurring where the broadcast feeds may be delivered for encoding and uploading may be to utilize a single broadcast feed to perform ACR fingerprinting and encoding and uploading. When a single broadcast feed is used, a number of devices and applications to be purchased, installed, monitored, and maintained for ACR fingerprinting and encoding and uploading may be reduced. For example, capital expenses (CAPEX) and/or operational expenses (OPEX) may be reduced, such as a reduced system infrastructure (rack space, power, and Ethernet connectivity). Additionally, when a single broadcast feed is used, a number of broadcast feeds generated from a broadcaster's distribution amplifier may be reduced.

The content device 302 may receive media content from a content feed and prepare the content to include contextually-relevant material that may be delivered to the media device 315. The media device 315 may include the ACR client 325 for performing ACR fingerprint matching locally on the media device. Initially, a request is sent to a server device (such as the ACR fingerprinter server 105 or the look-up server 206) to identify the video. Once successful, a set of fingerprints associated with the video is downloaded to the requesting media device 315. From that point on, most requests for matching may be performed locally on the requesting media device, until a low confidence result is produced, e.g., a fingerprint of the media content no longer matches the downloaded set of fingerprints. Responsive to failure to match a new fingerprint, a new request may be sent to the server device to match the new fingerprint, which may match to a new channel, and the process repeats. Ideally, only one request is sent to the server device per video or channel. However, in some embodiments, more than one request to the server device may be made per video or channel; however, these requests may be fewer than requests made by a media device without the local fingerprint matching as described herein.

In another embodiment, the following pseudo-code represents how ACR fingerprint local matching may be performed on the client device.

```
for each request (;;)
{
  if ACR client does not have a copy of video fingerprints
  {
    send the request to matching server which performs matching
    download the set of fingerprint to local device
  }
  else
  {
    perform local matching
    if local matching produces low quality result
    {
      send the request to matching server which performs matching
      download the set of fingerprint to local device
    }
  }
}
```

In one embodiment, the ACR client uses a local matching algorithm to perform ACR fingerprint matching. It may use a server for matching only when necessary, thus reducing computing and communication requirements imposed on the server.

Figure 4:
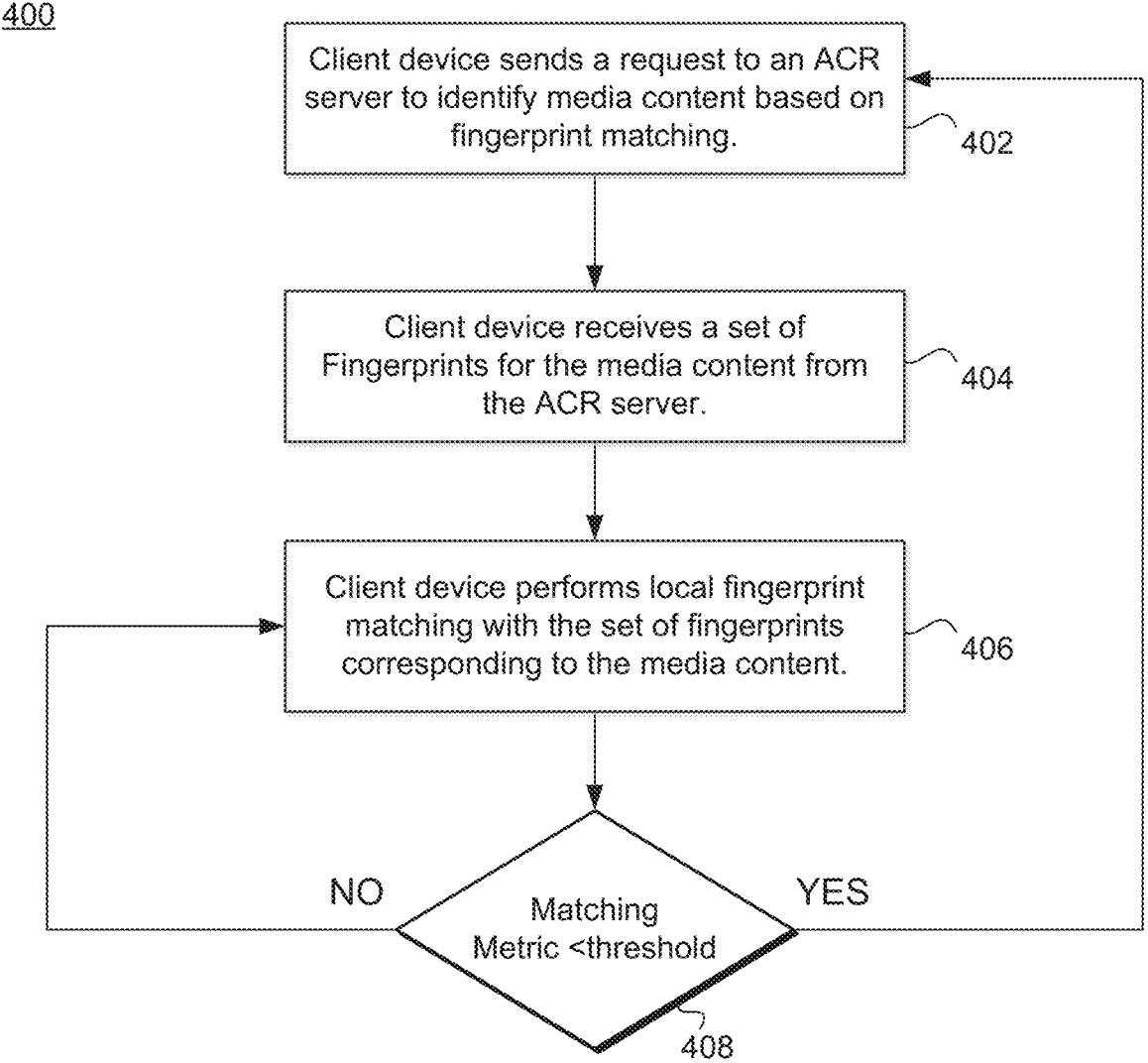
FIG. 4 illustrates a flowchart of a method of a media device fingerprinting of media content and local matching of fingerprints according to one embodiment.

FIG. 4 illustrates a flowchart of a method 400 of a media device automatic content recognition (ACR) fingerprinting and local matching according to one embodiment. The method 400 may be at least partially performed by processing logic that may include hardware (e.g., circuitry, dedicated logic, programmable logic, microcode, etc.), software (e.g., instructions executed by a processing device), firmware or a combination thereof. The method 400 may be performed by processing logic of a media device 115, such as any of the devices 114-120 of FIG. 1. In a related embodiment, the ACR client 125 or 325 may perform the method 400. Alternatively, the method 400 may be performed by other processing devices in various types of user device, portable devices, televisions, projectors, or other media devices.

Referring to FIG. 4, the method 400 begins with sending a request, by an ACR client, to an ACR server to identify media content based on a fingerprint (402). The ACR client may generate a sequence of frames (such as two to three seconds worth of frames depending on speed of content streaming) as the fingerprint sent to the server for ACR matching. The server performs server-side matching to identify the media content and sends a set of fingerprints associated with the identified media content back to the ACR client. The ACR client receives the set of fingerprints from the ACR server (404). The ACR client performs local fingerprint matching on a client media device with the set of fingerprints corresponding to the media content (406). The ACR client also determines a matching metric, such as a quality or confidence level of the matching, and compares the matching metric against a threshold level of matching (408). When the matching metric is less than the threshold, the ACR client returns to block 402 to send a new request to the ACR server to determine a match to a new channel. However, when the matching metric is equal to or greater than the threshold, the ACR client continues performing the local fingerprint matching (406). In this way, the ACR client need not continue to ping the ACR server to confirm that the media content is being streamed from the same channel or television program.

Figure 5:
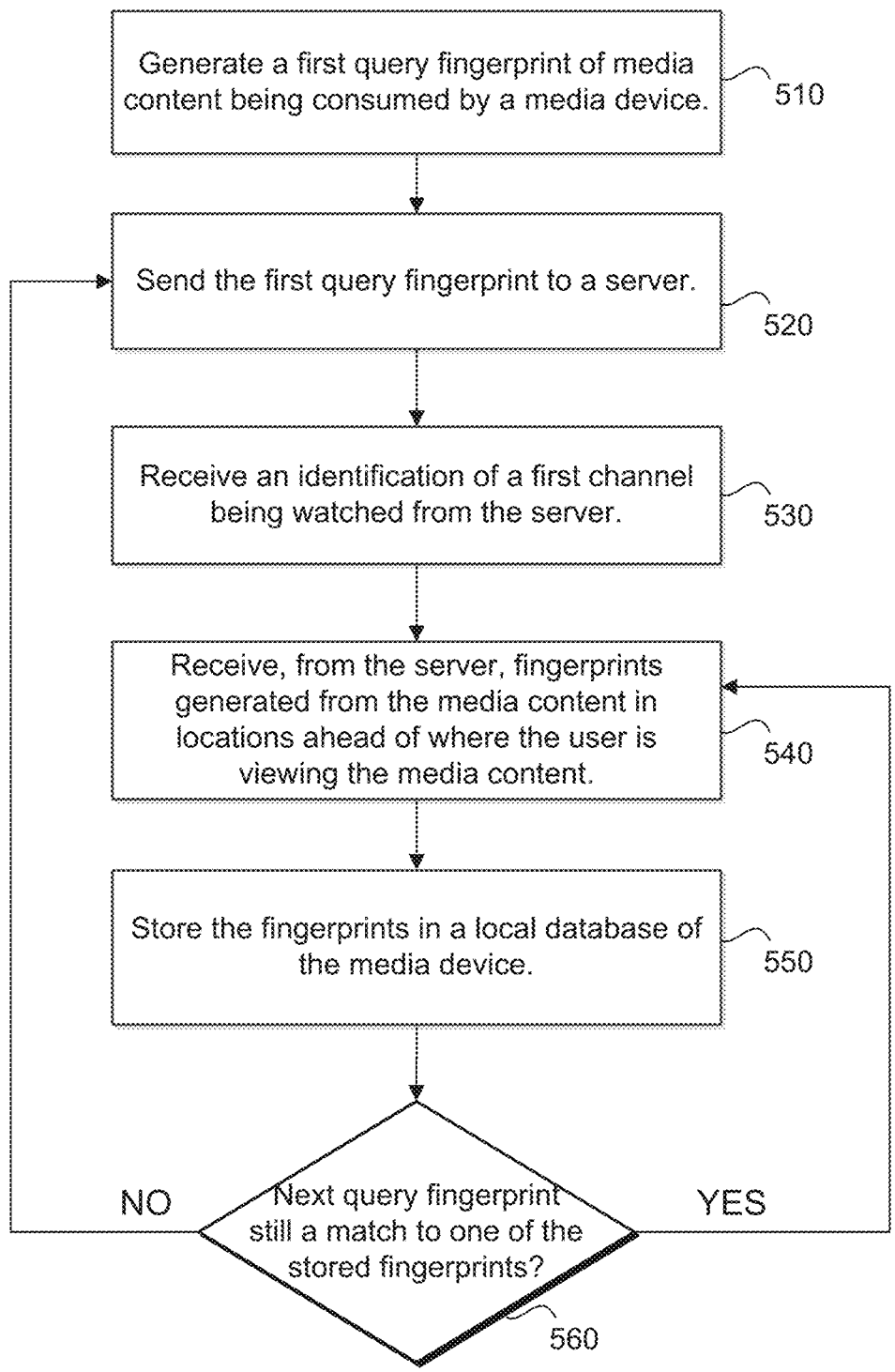
FIG. 5 illustrates a flowchart of a method of a media device fingerprinting of media content and local matching of fingerprints according to another embodiment.

FIG. 5 illustrates a flowchart of a method 500 of a media device fingerprinting of media content and local matching of fingerprints according to another embodiment. The method 500 may be at least partially performed by processing logic that may include hardware (e.g., circuitry, dedicated logic, programmable logic, microcode, etc.), software (e.g., instructions executed by a processing device), firmware or a combination thereof. The method 400 may be performed by processing logic of a media device 115, such as any of the devices 114-120 of FIG. 1. In a related embodiment, the ACR client 125 or 325 may perform the method 400. Alternatively, the method 400 may be performed by other processing devices in various types of user device, portable devices, televisions, projectors, or other media devices.

Referring to FIG. 5, the method begins with a media device 115 or 315 generating a first query fingerprint of media content consumed by a user (510). The media device sends the first query fingerprint to an ACR server for content matching (520). The media device receives an identification of a first channel being watched by the user in response to the server finding a match to the first query fingerprint (530). The media device then receives a plurality of fingerprints generated from the media content in locations ahead of where the user is viewing the media content (540). The media device stores the plurality of fingerprints received from the server in a local database within computer-readable medium of the media device (550). The computer-readable storage medium of the media device may be a first-in, first-out (FIFO) memory in which the oldest of the plurality of fingerprints exit first as the memory fills up. In an example where the media content is not a live video stream (e.g., it has been pre-stored), the server may send all fingerprints for a program on the first channel, assuming the media device can store them all.

The media device then continues to match a next query fingerprint to the plurality of locally stored fingerprints, and in so doing, determines whether the user is still watching the same channel or program (560). The matching may be determined according to a level of meeting a threshold of a matching metric between the next query fingerprint and any of the plurality of fingerprints that have been received from the server and stored in the local database. The threshold of the matching metric may reflect a confidence level that an error in match results is low enough that there is a sufficiently high probability of a match.

When a match is still found in the plurality of fingerprints, the first channel is still being watched, and the method loops back to block 540, continuing to receive the plurality of fingerprints generated ahead of a location in the media content from where the user is watching (540), and to store the plurality of fingerprints in the local database (550) for continued local ACR matching.

When a match it not found, the channel on the media device has been changed and the method returns to block 520 with sending the non-matching fingerprint to the ACR server to find a match to a second channel to which the user has changed on the media device. The method then continues as before with receiving from the server an identification of the second channel and a plurality of fingerprints of the media content of the second channel for local storage.

With further reference to block 540, the server may send not only the plurality of fingerprints of the media content of the first channel the user is currently watching, but also a second plurality of fingerprints of media content being streamed to channels located near the first channel on a channel guided. For example, if CBS is the first channel and is located between NBC and CBS, then the media device may also receive from the server a plurality of fingerprints for content being streamed to NBC and CBS.

Alternatively, or additionally, the ACR server (optionally in conjunction with the ad targeter 212 of FIG. 2) may track the channels the user most often watches (e.g., the user's favorite channels and/or programs) and also send a plurality of fingerprints to those channels on a continuous basis for local ACR matching. With the last two examples (the nearby local channels and the user's favorite channels), an upper limit may be set to how many fingerprints are streamed for storage on the media device, constrained by a practical limit of storage space on some media devices, such as a smart TV or an application on a handheld device, depending on a size of the streaming fingerprints.

Figure 6:
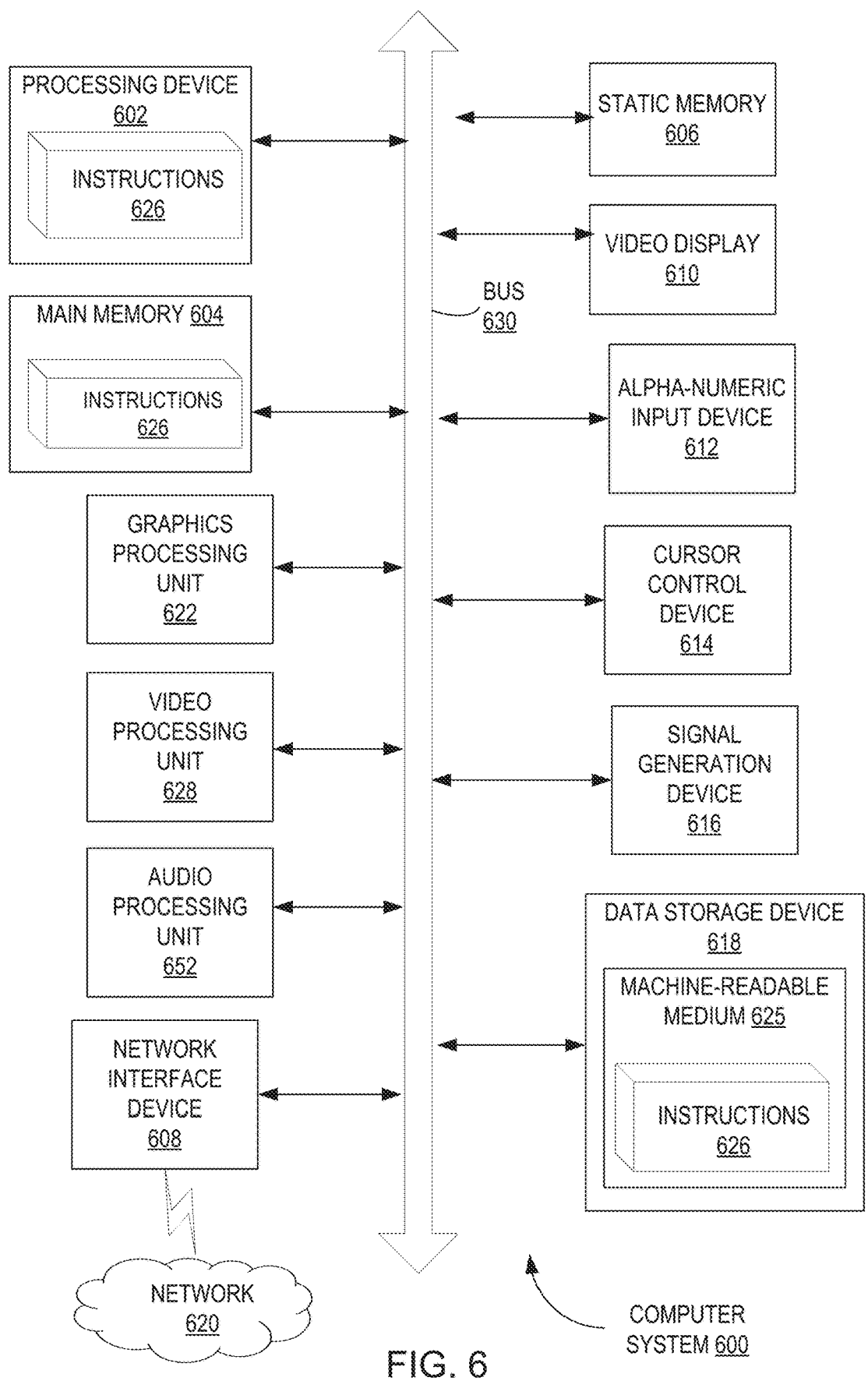
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 may correspond to the ACR fingerprinter server 105 of FIG. 1. The computer system 600 may correspond to any of the media devices 115 of FIG. 1, or to the media device 315 of FIG. 3 or to all or a part of the content manager 122 of FIGS. 1 and 2. The computer system 600 may correspond to at least a portion of a cloud-based computer system such as discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In one embodiment, processing device 602 may include one or more processing cores. The processing device 602 is configured to execute the instructions 626 of a mirroring logic for performing the operations discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a signal generation device 616 (e.g., a speaker), or other peripheral devices. Furthermore, computer system 600 may include a graphics processing unit 622, a video processing unit 628, and an audio processing unit 632. In another embodiment, the computer system 600 may include a chipset (not illustrated), which refers to a group of integrated circuits, or chips, that are designed to work with the processing device 602 and controls communications between the processing device 602 and external devices. For example, the chipset may be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 may include a computer-readable storage medium 624 on which is stored instructions 626 embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting computer-readable storage media.

The computer-readable storage medium 624 may also be used to store instructions 626 utilizing logic and/or a software library containing methods that call the above applications. While the computer-readable storage medium 624 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below.

Although the embodiments are herein described with reference to a processor or processing device, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and may be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A media device comprising:
   at least one processing device; and
   a non-transitory computer-readable medium storing program instructions that, when executed by the at least one processing device, cause the media device to perform operations comprising:
      generating a first query fingerprint of first media content being consumed by the media device;
      sending the first query fingerprint to a server;
      in response to the server finding a match to the first query fingerprint:
         (i) receiving, from the server, an identification of a first channel being watched via the media device;
         (ii) receiving, from the server, a first plurality of fingerprints generated from first upcoming media content to be displayed on the first channel after the first media content; and
         (iii) receiving, from the server, a second plurality of fingerprints of second upcoming media content to be displayed on a second channel, the second channel being listed on a channel guide with the first channel and watched via the media device at a threshold watch rate or higher;
      storing the first plurality of fingerprints and the second plurality of fingerprints in a local database of the media device;
      generating a second query fingerprint of second media content being consumed by the media device;
      comparing the second query fingerprint with the first plurality of fingerprints and with the second plurality of fingerprints stored in the local database; and
      determining whether the media device remains set on the first channel or has changed to the second channel based on the comparison of the second query fingerprint.

2. The media device of claim 1, wherein the operations further comprise, responsive to detecting a non-match of the second query fingerprint with the first plurality of fingerprints and the second plurality of fingerprints, sending the second query fingerprint to the server to obtain an identification of a third channel different than the first channel and the second channel.

3. The media device of claim 2, wherein the operations further comprise receiving, from the server, the identification of the third channel responsive to the second query fingerprint matching a respective fingerprint of a third plurality of fingerprints stored on the server from third media content streamed to the third channel.

4. The media device of claim 2, wherein detecting the non-match of the second query fingerprint comprises determining that the second query fingerprint fails to meet a threshold of a matching metric between the second query fingerprint and any of the first plurality of fingerprints and the second plurality of fingerprints, wherein the matching metric comprises a confidence level in a match.

5. The media device of claim 1, wherein the operations further comprise, in response to the server finding the match to the first query fingerprint, receiving, from the server, a third plurality of fingerprints of a third media content to be streamed to a third channel located sequentially adjacent to the first channel on the channel guide.

6. The media device of claim 1, wherein the first query fingerprint and the second query fingerprint both comprise a sequence of frames of media content spanning a predetermined number of seconds.

7. The media device of claim 1, wherein the non-transitory computer-readable medium comprises a first-in, first-out (FIFO) memory in which an oldest of the first plurality of fingerprints and of the second plurality of fingerprints exits first.

8. A method comprising,
generating, by a media device, a first query fingerprint of first media content being consumed by the media device;
sending, by the media device, the first query fingerprint to a server;
in response to the server finding a match to the first query fingerprint:
  (i) receiving, by the media device from the server, an identification of a first channel being watched via the media device;
  (ii) receiving, from the server, a first plurality of fingerprints generated from first upcoming media content to be displayed on the first channel after the first media content; and
  (iii) receiving, from the server, a second plurality of fingerprints of second upcoming media content to be displayed on a second channel, the second channel being listed on a channel guide with the first channel and watched via the media device at a threshold watch rate or higher;
storing, by the media device, the first plurality of fingerprints and the second plurality of fingerprints in a local database of the media device;
generating a second query fingerprint of second media content being consumed by the media device;
comparing, by the media device; the second query fingerprint with the first plurality of fingerprints and with the second plurality of fingerprints stored in the local database; and
determining; by the media device, whether the media device remains set on the first channel or has changed to the second channel based on the comparison of the second query fingerprint.

9. The method of claim 8, wherein the first plurality of fingerprints received from the server include all fingerprints associated with the first upcoming media content.

10. The method of claim 8, further comprising, responsive to detecting a non-match of the second query fingerprint with the first plurality of fingerprints and the second plurality of fingerprints, sending the second query fingerprint to the server to obtain an identification of a third channel different than the first channel and the second channel.

11. The method of claim 10, further comprising receiving, from the server, the identification of the third channel responsive to the second query fingerprint matching a respective fingerprint of a third plurality of fingerprints stored on the server from a third media streamed to the third channel.

12. The method of claim 8, further comprising, in response to the server finding the match to the first query fingerprint, receiving a third plurality of fingerprints of third upcoming media content to be streamed to a third channel located sequentially adjacent to the first channel on the channel guide.

13. A non-transitory computer-readable medium comprising program instructions that, when executed by at least one processor of a media device, cause the media device to perform operations comprising:
generating a first query fingerprint of first media content being consumed by the media device;
sending the first query fingerprint to a server;
in response to the server finding a match to the first query fingerprint:
  (i) receiving, from the server, an identification of a first channel being watched via the media device;
  (ii) receiving, from the server, a first plurality of fingerprints generated from first upcoming media content to be displayed on the first channel after the first media content; and
  (iii) receiving, from the server, a second plurality of fingerprints of second upcoming media content to be displayed on a second channel, the second channel being listed on a channel guide with the first channel and watched via the media device at a threshold watch rate or higher;
storing the first plurality of fingerprints and the second plurality of fingerprints in a local database of the media device;
generating a second query fingerprint of second media content being consumed by the media device;
comparing the second query fingerprint with the first plurality of fingerprints and with the second plurality of fingerprints stored in the local database; and
determining whether the media device remains set on the first channel or has changed to the second channel based on the comparison of the second query fingerprint.

14. The non-transitory computer-readable medium of claim 13, wherein the operations further comprise, responsive to detecting a non-match of the second query fingerprint with the first plurality of fingerprints and the second plurality of fingerprints, sending the second query fingerprint to the server to obtain an identification of a third channel different than the first channel and the second channel.

15. The non-transitory computer-readable medium of claim 14, wherein the operations further comprise receiving; from the server, the identification of the third channel responsive to the second query fingerprint matching a respective fingerprint of a third plurality of fingerprints stored on the server from third media content streamed to the third channel.

16. The non-transitory computer-readable medium of claim 13, wherein the operations further comprise receiving a third plurality of fingerprints of third media content to be streamed to a third channel located sequentially adjacent to the first channel on the channel guide.

17. A media device comprising:
at least one processing device; and
a non-transitory computer-readable medium storing program instructions that, when executed by the at least one processing device, cause the media device to perform operations comprising:
  generating a first query fingerprint of first media contentbeing consumed by the media device;
  sending the first query fingerprint to a server;
  in response to the server finding a match to the first query fingerprint:
    (i) receiving, from the server, an identification of a first channel being watched;
    (ii) receiving, from the server, a first plurality of fingerprints generated from first upcoming media content scheduled to be displayed on the first channel after the first media content; and (iii) receiving, from the server, a second plurality of fingerprints of second upcoming media content to be displayed on a second channel, the second channel being listed on a channel guide sequentially adjacent to the first channel;

storing the first plurality of fingerprints and the second plurality of fingerprints in a local database of the media device;

generating a second query fingerprint of second media content being consumed by the media device;

comparing the second query fingerprint with the first plurality of fingerprints and with the second plurality of fingerprints stored in the local database; and determining whether the media device remains set on the first channel or has changed to the second channel based on the comparison of the second query fingerprint.

18. The media device of claim 17, wherein the operations further comprise, responsive to detecting a non-match of the second query fingerprint with the first plurality of fingerprints and the second plurality of fingerprints, sending the second query fingerprint to the server to obtain an identification of a third channel different than the first channel and the second channel.

19. The media device of claim 18, wherein the operations further comprise receiving, from the server, the identification of the third channel responsive to the second query fingerprint matching a respective fingerprint of a third plurality of fingerprints stored on the server from third media content streamed to the third channel.

20. The media device of claim 18, wherein detecting the non-match of the second query fingerprint comprises determining that the second query fingerprint fails to meet a threshold of a matching metric between the second query fingerprint and any of the first plurality of fingerprints and the second plurality of fingerprints, wherein the matching metric comprises a confidence level in a match.

21. The media device of claim 17, wherein the operations further comprise, in response to the server finding the match to the first query fingerprint, receiving, from the server, a third plurality of fingerprints of a third media content to be streamed to a third channel located sequentially adjacent to the first channel or the second channel on the channel guide.

* * * * *